(12) United States Patent
Gopinath

(10) Patent No.: US 7,761,011 B2
(45) Date of Patent: Jul. 20, 2010

(54) OPTICAL FIBER COMMUNICATION LINK

(75) Inventor: Anand Gopinath, Wayzata, MN (US)

(73) Assignee: KG Technology Associates, Inc., Waterville, MN (US)

( * ) Notice: Subject to any disclaimer, the term of this patent is extended or adjusted under 35 U.S.C. 154(b) by 866 days.

(21) Appl. No.: 11/361,019

(22) Filed: Feb. 23, 2006

(65) Prior Publication Data

US 2006/0239687 A1    Oct. 26, 2006

Related U.S. Application Data

(60) Provisional application No. 60/655,652, filed on Feb. 23, 2005.

(51) Int. Cl.
   H04B 10/00    (2006.01)
(52) U.S. Cl. .......................... 398/155; 398/32; 398/141
(58) Field of Classification Search ............... 398/140, 398/141, 154, 155
   See application file for complete search history.

(56) References Cited

U.S. PATENT DOCUMENTS

| | | | | |
|---|---|---|---|---|
| 4,768,186 A * | 8/1988 | Bodell | .................. | 398/76 |
| 5,003,624 A * | 3/1991 | Terbrack et al. | .................. | 398/198 |
| 5,016,242 A * | 5/1991 | Tang | .................. | 398/76 |
| 5,020,049 A * | 5/1991 | Bodeep et al. | .................. | 398/76 |
| 5,023,945 A * | 6/1991 | Childs | .................. | 398/161 |
| 5,161,044 A * | 11/1992 | Nazarathy et al. | .................. | 398/194 |
| 5,343,324 A * | 8/1994 | Le et al. | .................. | 398/198 |
| 5,390,185 A * | 2/1995 | Hooijmans et al. | .................. | 370/431 |
| 5,430,569 A * | 7/1995 | Blauvelt et al. | .................. | 398/199 |
| 5,432,632 A * | 7/1995 | Watanabe | .................. | 398/76 |
| 5,513,029 A * | 4/1996 | Roberts | .................. | 398/32 |
| 5,515,196 A * | 5/1996 | Kitajima et al. | .................. | 398/185 |
| 5,526,158 A * | 6/1996 | Lembo | .................. | 398/204 |
| 5,526,164 A * | 6/1996 | Link et al. | .................. | 398/195 |
| 5,629,792 A * | 5/1997 | Masaki | .................. | 359/245 |
| 5,809,049 A * | 9/1998 | Schaefer et al. | .................. | 372/38.02 |
| 5,850,303 A * | 12/1998 | Yamamoto et al. | .................. | 398/91 |
| 6,072,618 A * | 6/2000 | Takenaka | .................. | 359/239 |
| 6,078,412 A * | 6/2000 | Fuse et al. | .................. | 398/1 |
| 6,271,942 B1 * | 8/2001 | Sasai et al. | .................. | 398/9 |
| 6,519,067 B2 * | 2/2003 | Farhan et al. | .................. | 398/98 |
| 6,626,588 B1 * | 9/2003 | Sasai et al. | .................. | 398/32 |
| 7,027,685 B2 * | 4/2006 | Harres | .................. | 385/24 |
| 7,110,672 B2 * | 9/2006 | Fuse | .................. | 398/79 |
| 7,110,682 B2 * | 9/2006 | Carrick et al. | .................. | 398/198 |

(Continued)

OTHER PUBLICATIONS

"RF Fiber-Optic Link Performance", Ackerman et al.; IEEE Microwave Magazine, Dec. 2001, pp. 50-58.

(Continued)

Primary Examiner—Agustin Bello
(74) Attorney, Agent, or Firm—Vidas, Arrett & Steinkraus, P.A.

(57) ABSTRACT

A communication includes an analog input configured to receive an analog signal. An analog to digital converter configured to provides a digital signal output based upon the analog input. A modulator is configured to modulate a laser based upon the digital signal thereby generating a modulated optical signal. An optical fiber carries the modulated optical signal and an optical detector arranged to receive the modulated optical signal from the optical fiber and provide a received output. A digital to analog converter digitizes the received output and provides an analog output based respective of the analog signal provided to the analog input.

15 Claims, 3 Drawing Sheets

U.S. PATENT DOCUMENTS

| | | | |
|---|---|---|---|
| 7,146,110 B2 * | 12/2006 | Frederiksen et al. | 398/194 |
| 7,155,122 B2 * | 12/2006 | Wan et al. | 398/32 |
| 7,158,723 B2 * | 1/2007 | Wan et al. | 398/32 |
| 7,190,897 B2 * | 3/2007 | Gehlot | 398/30 |
| 7,286,761 B2 * | 10/2007 | Birk et al. | 398/66 |
| 7,346,279 B1 * | 3/2008 | Li et al. | 398/32 |
| 7,349,637 B1 * | 3/2008 | Frederiksen et al. | 398/194 |
| 7,421,199 B2 * | 9/2008 | Bai | 398/30 |
| 2004/0213566 A1 * | 10/2004 | Takanashi et al. | 398/32 |
| 2006/0239695 A1 * | 10/2006 | Sayyah | 398/161 |

OTHER PUBLICATIONS

"Results from Keyword Search", Aug. 2004, 27 pages.

\* cited by examiner

OPTICAL FIBER COMMUNICATION LINK

The present application is based on and claims the benefit of U.S. provisional patent application Ser. No. 60/655,652, filed Feb. 23, 2005, the content of which is hereby incorporated by reference in its entirety.

BACKGROUND OF THE INVENTION

The present invention relates to communication of information between two locations. More specifically, the present invention relates to transmitting analog information signals between two locations using an optical fiber communication link.

Various communication techniques have been developed for transmitting information between two locations. One communication technique uses optical fibers to carry the information signal. However, due to a number of constraints, there are limitations on the amount of information which can be transmitted. In some situations, the signals to be transmitted are not easily digitized and therefore the fiber optic signals are transmitted in analog form. In other cases, for example, cable television signals, for various reasons the signals are transmitted in analog format.

SUMMARY OF THE INVENTION

The present invention utilizes digital fiber optical links to transport analog signals. The signals digitized for the transport and restored to analog format at the receiver.

DETAILED DESCRIPTION OF THE PREFERRED EMBODIMENTS

Figure 1:
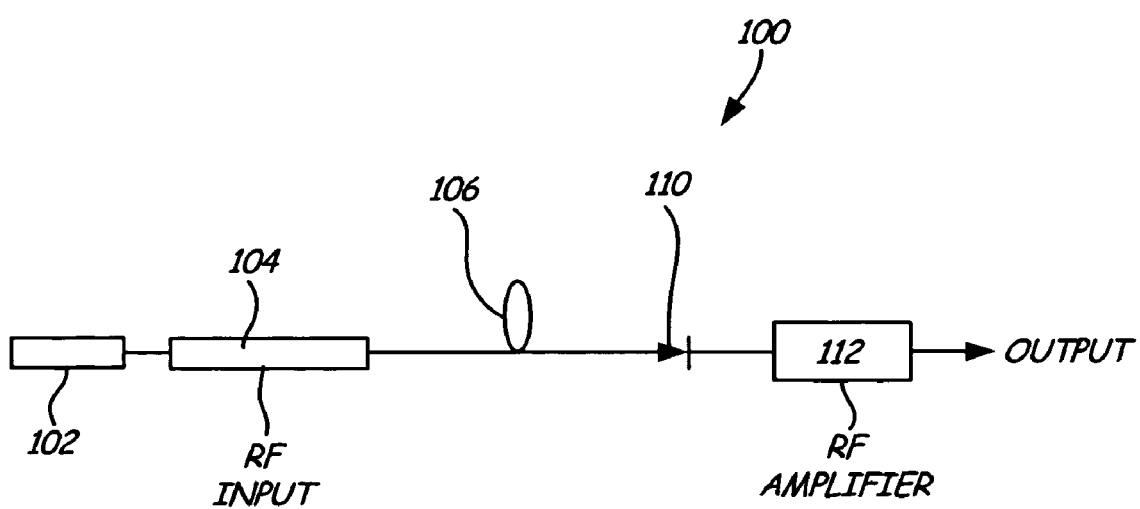
FIG. 1 is a diagram showing a fiber optic link.

Analog fiber optical links, such as illustrated in the link 100 schematic shown in FIG. 1, are currently of interest in several applications including RF antenna remoting, sensor data transmission, Cable TV distribution systems, fiber radio systems. Optical fiber link 100 includes a laser 102 and a modulator 104 receiving an RF input. Cable TV systems most often directly modulate the laser, after predistorting the signal to counter the distortion that results in laser modulation. The output of the modulator 104 is coupled to optical fiber 106 which connects to a photo diode 110 at a remote location. The photo diode 110 receives the optical signal and provides an electrical output to RF amplifier 112. RF amplifier 112 provides an output for subsequent processing.

Such analog links typically use amplitude modulation of the light signal to convey two items of information, the RF frequency tone and the base-band signal. In such a configuration, the base-band signal modulates the RF tone. The gain of the small signal link transporting the modulated RF tone is critically dependent on the laser input power. The higher the laser power is the lower the link insertion loss. The insertion loss dominates for input laser powers of less than 100 mW. There are stringent requirements for the linearity of the modulation process, and since it is extremely difficult to obtain linear modulators, modulation depth is limited to less than 5%.

One question that arises is why use analog fiber optic links when the digital ones are widely used in fiber communication systems, with their excellent bit error rate (BER) performance up to 40 Giga-bits per second (Gbps) and beyond. A digital scheme converts the RF input into a digital signal through an Analog-to-Digital Converter (ADC), which is transmitted through the digital link. After detection, it is reconverted to the RF signal through a Digital-to-Analog converter (DAC). However, when the RF frequency is higher than a few Gigahertz (this is constantly moving upwards), ADCs and DACs are not allowable. With the present inventor, a new architecture is provided where digital transmission is used to transport the analog signals. This provides a method of overcoming the frequency limitation of the converters discussed above.

Figure 2:
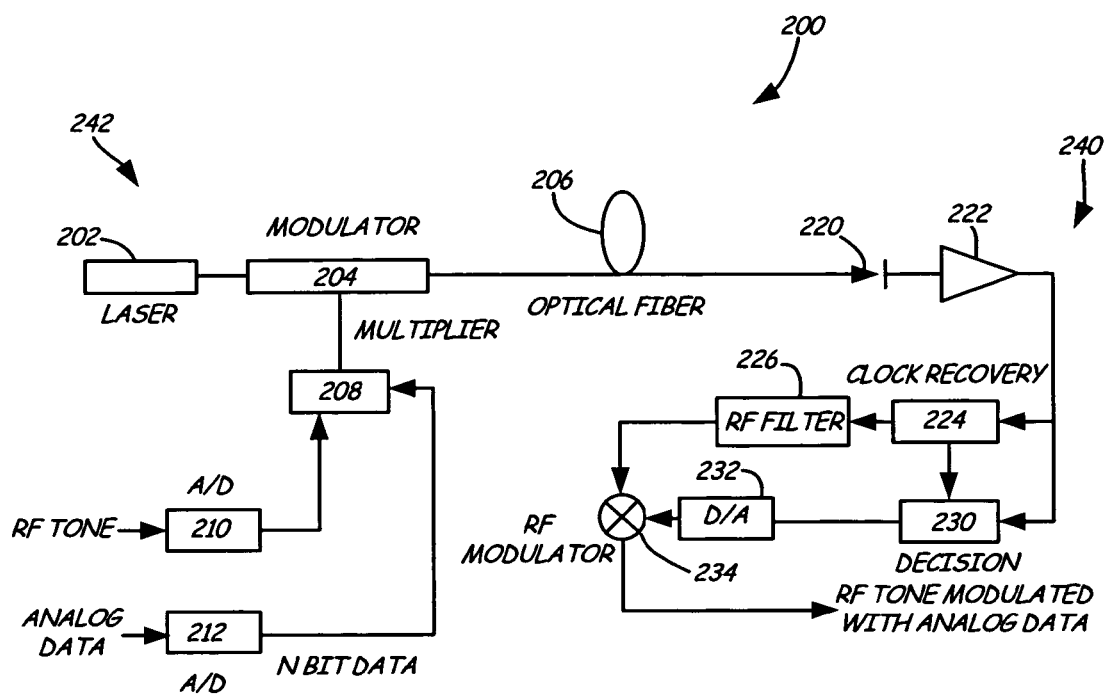
FIG. 2 is a simplified block diagram showing the fiber optic link in accordance with one embodiment of the present invention.

FIG. 2 is a simplified block diagram showing link 200 in accordance with one example embodiment of the present invention. Link 200 includes a laser 202 coupled to a modulator 204. A multiplier 208 couples to modulator 204 and receives and RF tone from a one-bit A to D converter 210 along with digitized analog data from A to D converter 212. The output of the modulator is applied to an optical fiber connection 206 and received by a photo diode 220. The output of the photo diode 220 is amplified by amplifier 222 and provided to a clock recovery circuit 224 and a decision circuit 230. Recovered clock signal from clock recovery circuit 224 is provided to a RF filter 226 whose output couples to RF modulator 234. Similarly, the output from decision block 230 is converted into an analog signal by digital to analog converter 232 which also couples to RF modulator 234. RF modulator 234 provides an output having a RF tone modulated with the original analog data.

Analog optical fiber links usually convey two items of information, the RF frequency tone and the base band signal, the base band signal modulates the RF tone. In the new architecture for the analog link 200 of the present invention, the RF tone is converted to a data stream at the RF frequency by A/D converter 210. For example, the tone can be applied to a Schmitt trigger or similar circuit and provided to multiplier 208. This configuration provides a one-bit ADC at the RF frequency, and creates the one-bit return-zero stream at this RF frequency, which is called the RF clock. At the transmitter 242, this one-bit conversion may also be performed at the modulator 204 by biasing the signal just above or below of modulator, so that the sine wave of the RF tone becomes a one-bit stream. The base-band signal is sent to a slow ADC 212 to digitize it to the required resolution. This digitized data is then multiplied with the RF clock, and the output of the multiplier 208 is sent to the optical modulator 204. An alternative to multiplication is to sum the RF clock signal and the digitized data signal. If there is no base-band signal, then the one-bit tone is sent to the modulator 204 without further modification.

At the receiver 240, the signal is detected by photo diode 220, amplified by amplifier 222, and sent to a clock recovery circuit 224. Circuit 224 can comprise of, for example, a phase lock loop (PLL). Such a PLL can include the phase detector, loop filter, and voltage controlled oscillator (VCO). This recovers and regenerates the RF clock. The recovered clock is then passed through a narrow band filter 226 to obtain the RF tone. An alternative clock recovery circuit comprises a narrow band filter, a limiter, and a static phase shifter. However, the phase lock loop is the preferred technique. The regenerated RF clock recovers the digitized base-band signal through the decision circuit 230, which is in effect, a demultiplexer.

The circuit 232 receives an output from the clock recovery circuit and provides an output which indicates whether a binary one or zero was received. Such circuits are known in the art. This is converted to analog format by a DAC 232. The RF tone is modulated by this base-band analog signal at RF modulator 234. This provides an analog output comprising an RF tone modulated with analog data. Note that known scrambling techniques can be added to improve performance.

The link 200 is configured on traditional dispersion and loss criteria to obtain a specific bit error rate as desired, for example, $10^{-9}$ or lower. The signal to noise ratio (SNR) at the output of decision circuit 230 for a bit error rate of $10^{-9}$ is about 21.6 dB. There is further reduction in this SNR figure as the signals are processed by the DAC 232, and the RF modulator 234. Thus, linearity of the modulator is no longer an issue. Furthermore, the laser power level may be low, on the order of a few milliwatts. Since the clock extraction circuit 224 effectively regenerates the clock and hence the RF tone, and base-band signals are also regenerated, their noise figure is determined by the regeneration process, and thus, largely by the bit error rate of the link.

For providing a signal to a remote antenna, where only the RF tone needs to be sent, the data stream, the multiplexer, decision circuit, demultiplexer, and RF modulator are not required. For a fixed frequency system, the clock recovery circuit 224 can take the form of a narrow band RF filter. For a wide band system, the clock recovery circuit 224 can be designed to obtain the clock as transmitted, and then pass the signal through a tunable filter to obtain the RF tone.

Figure 3:
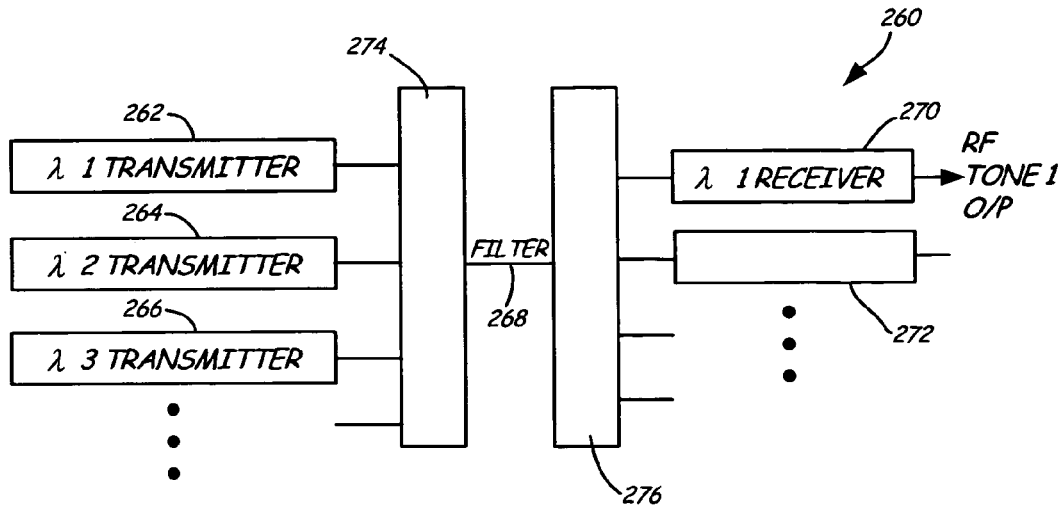
FIG. 3 is a diagram showing a fiber optic link using multiple transmitters and receivers.
Figure 4:
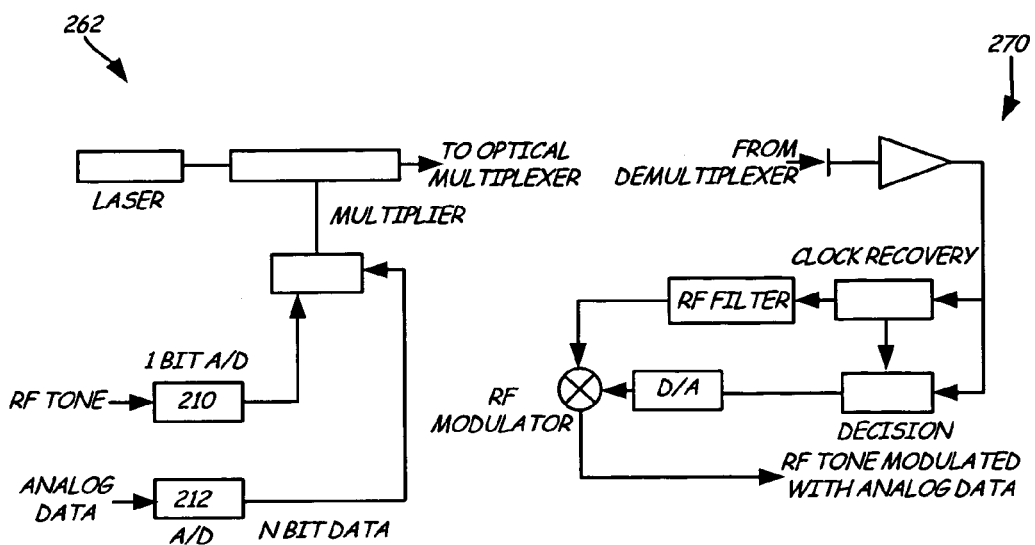
FIG. 4 shows an individual transmitter and receiver for use in the configuration of FIG. 3.

FIG. 3 is a block diagram of a multiple RF tone communication link system 250 in which a plurality of transmitters 262, 264, 266 . . . couple through a single fiber optic connection 268 to a plurality of receivers 270, 272, . . . . An optical multiplexer 274 is used to couple the transmitter 262-266 to fiber 268. Similarly, an optical demultiplexer 276 couples the fiber 268 to receivers 270, 272. FIG. 4 is a more detailed block diagram of transmitter 262 and receiver 270.

For multiple RF tone systems, each tone is converted into its 1 bit clock signal, data in digitized form is multiplexed with it, and the output is fed to a modulator with a laser, wavelength $\lambda_i$, where i is the tone number. These multiple optical wavelengths modulated by the clock and data are sent to an optical multiplexer 274 and then to the fiber 268. At the receiver, the signal is sent to an optical demultiplexer 276, which separates the different wavelengths, and in turn, each is sent to a clock recovery circuit, the data is electrically demultiplexed and passed through a D/A convertor, the clock passes through a filter to be converted into the corresponding RF tone. The RF tone is modulated by the data, and sent on to its destination. For extremely high frequency tones, for example, 70 GHz upwards, (this figure is constantly moving upwards) a one-bit Schmitt trigger circuit is unlikely to function well. This is because the devices need to have cut-off frequencies well in excess of three times the RF tone. In this case a subharmonic of the RF tone can be created and used to generate the one-bit signal. With such a system, multitone analog link pulses from a Schmitt trigger circuit are sent to the modulator to obtain optical pulses at this sub-harmonic frequency. At the receiver, these subharmonic pulses are regenerated through the clock recovery circuit, and RF filter obtains the subharmonic tone. Multiplication of this subharmonic tone generates the required RF tone.

Wide band frequency hopped systems are systems which have the sequence of frequencies predetermined, and the receiver clock recovery circuit can operate at each of these frequencies. One choice is to have as many clock recovery units as there are frequencies, and the signal is sequentially switched to the appropriate clock recovery unit. This ensures that the PLL acquisition or lock time to be as short as possible. The alternative is to have wide band phase detector and VCO, and also include a frequency detector in the PLL, although this is not the preferred choice, because the acquisition times become longer. For systems without predetermined frequency hopped patterns, the RF tone needs to be identified before the signal is sent to the wide band clock recovery circuit, and this is identical to wide band wireless systems. The frequency detector determines the frequency of the incoming pulse stream, and then sets the synthesizer VCO to the correct frequency for the phase lock loop. The frequency detector also sets the tunable RF filter so that the output of the clock recovery circuit through this filter is now the required RF tone. For simultaneous multiple RF tones in a wide band system, the wavelength division multiplexed technique discussed above resolves the various tones. Again, if these RF tones are not predetermined, then the receiver design for acquiring the clock and data for each channel follows the discussion above.

For fiber radio systems, it is necessary to separate the RF tone and the data for digital data transport. The RF tone with the modulating data, is down-converted to obtain the base-band analog data, and the RF tone is recovered by passing the signal through a narrow band filter centered at the RF tone, eliminating the data sidebands. The RF tone is converted into a 1-bit clock signal and the data is converted to digital form. Such a clock signal is not required if other types of A/D converters are used. The clock is then multiplied with the data, and the signal applied to an optical modulator. This modulates the laser light in a digital format. At the receiver, the process is reversed, and the recovered analog data modulates the regenerated RF tone as required.

A large variety of analog techniques are available for the distribution of video signals, most based on subcarrier multiplexed (SCM) system. The present invention is applicable to the distribution of High Definition Television (HDTV). For example, such a system can employ a digital signal for each channel as a 64 level Quadrature Amplitude Modulation signal. The distribution can use an SCM system. This technique can be used for the distribution of HDTV digital signals, which is in effect analog transport of digital signals on the optical fiber network, so as to minimize the impact of the change over from pure analog signals to this hybrid technique. The transport method of the invention includes the use of the digitized signals, and transports this data stream in a digital fiber optic link. Multiple video signals are transported in one of two techniques. In the first, the analog video signals are frequency division multiplexed (FDM), and then digitized in an ADC with a suitable clock. The fiber optic transport is digital. At the receiver, the data is recovered through a clock recovery (of the ADC clock) and decision circuit, and the composite frequency division multiplexed video signal is recovered and demultiplexed to obtain video signals. The alternative is to digitize each video channel, and modulate lasers or use modulators at different wavelengths, using wavelength division multiplex (WDM) techniques. Recovery of the digital signals follows after demultiplexing the various wavelengths, and then the analog video signals are recovered by passing the digitized signals through DACs. This second technique becomes expensive to implement.

Current SONNET system hardware at various bit rates of 2.5, 10, and 40 Gbps may also be used for transport of the RF clock multiplied by the digitized based-band signal. Note that these usually use non-return zero (NRZ) signaling techniques, which implies that the bandwidth is only half the data rates. The one-bit RF clock multiplied by, or added to, the base-band data should pass through a signal conditioner circuit to ensure that the ones and zeros are not lost, and that the signal is recovered at the receiver.

In general, analog information to be transported through the fiber optical link is converted to digital form. Thus an analog optical fiber link is converted to an equivalent digital optical fiber link. At the receiver, the digital signals are regenerated in digital form, and then converted to analog format to restore the analog information. Thus, the design of the link is determined by the digital data to be recovered and regenerated, by the bit error rate, and other considerations. When the analog information to be transported is a single RF tone, then that tone is sent to a Schmitt trigger or other circuit to create a one-bit return-zero clock at the RF tone frequency. This one-bit clock is sent to a modulator which modulates the light from a laser, for example a distributed-feedback (DFB) laser. This modulated light is sent down the optical fiber to its destination. The one-bit RF clock stream may also be generated by sending the RF tone to a high bandwidth modulator, biased close to being off initially, so that a one-bit stream is produced by the drive circuit. At the receiver, the optical signal is detected, amplified, and sent to a clock recovery circuit, which consists of a phase lock loop, which has a phase detector, a low pass filter, and a voltage-controlled oscillator, and optionally a frequency detector within the feedback loop. Here the one-bit clock is regenerated. Passing this recovered clock through a narrow band filter recovers the RF tone with no distortions. An alternative clock recovery circuit consists of a narrow band RF filter, a limiter, and a static phase sifter, and here again the RF tone is recovered as above. The maximum frequency response of the Schmitt trigger circuit for generating the one-bit clock from the RF tone is determined by current technology, and at the current time this is in the 40 to 50 GHz range and this is moving upwards. For a RF tone at frequencies higher than this, a sub-harmonic of the original tone is obtained through a suitable RF circuit, and the sub-harmonic one-bit return-zero clock is generated, and this is sent to the modulator to obtain sub-harmonic optical pulses. At the receiver, the sub-harmonic RF tone is recovered as above, and then the sub-harmonic RF tone is multiplied up to recover the RF tone. The alternative to sub-harmonic RF tone transmission discussed in above is to use a high bandwidth modulator biased just above or below the switching voltage. The RF tone is sent to this modulator, and generates the one-bit optical data stream, which is then recovered at the receiver as discussed above. When several tones are required to be transported, then each tone is sent to a Schmitt trigger to generate its corresponding one-bit clock, and each one-bit clock is sent to a modulator which modulates a laser at a different wavelength. The modulated light at the different wavelengths are sent to an optical multiplexer, which sends the multiplexed light to the optical fiber transporting the different clocks, each at a different wavelength. At the receiver, the fiber signal is sent to an optical demultiplexer, which separates the different wavelengths, and then each wavelength is sent to a clock recovery cir-cuit to regenerate and recover the corresponding RF tone. Here again, the modulators may also act as the one-bit generator of the tones. When a base-band signal in analog format is to be transported in addition to a corresponding RF tone, then this base-band signal is digitized, and electrically multiplied with the RF tone's one-bit clock, sent to the optical modulator to generate the optical pulses of the electrical multiplied signal. At the receiver, the clock recovery circuit regenerates the clock, and the decision circuit recovers and regenerates the base-band digitized signal. A narrow band filter recovers the RF tone, a DAC recovers the base-band analog signal, and the base-band analog signal may modulate the RF tone through a RF modulator if this format is required. When the base-band data is to be transported in addition to the RF tone, digitizing both the tone and the base-band data, results in the one-bit clock and the digitized data which may be added instead of multiplied. At the receiver, low pass and high pass filters separate the signals which are then regenerated separately, and converted to analog signals as discussed above. Several base-band signals with associated RF tones are treated as above with the wavelength division multiplexed scheme. A base-band signal without a RF tone is digitized at a suitable clock rate, usually three times the maximum frequency of the signal, and sent to the optical modulator, to generate optical pulses. At the receiver, the detected and amplified pulses go to a clock recovery circuit, and decision circuit to regenerate the digitized signal, and this is sent to a DAC to recover the analog signal. Similarly, when several base-band signals are to be transported several alternatives can be used. The first scheme has the base-band signals frequency multiplexed, and then digitized. These are sent to the optical modulator, transported, and at the receiver, detected, recovered, demultiplexed to obtain the individual base-band signals. In the another configuration, the different base band signals are digitized at the same clock frequency, and then time domain multiplexing is used to transmit these signals. At the receiver, the receiver extracts the clock and the time sliced data, which is then restored into its various data streams, and each is converted into analog format as required by DACs. In the third scheme, they are digitized, and each sent to modulators to obtain optical pulses are different wavelengths. These are optically multiplexed and sent down the fiber, and at the receiver, these wavelengths are separated by an optical demultiplexer, before being detected, amplified and regenerated, and sent through appropriate DACs. Another scheme is to digitize the individual video streams in the usual manner, and then use time division multiplexing to transport the individual streams. At the receiver, the usual recovery techniques are used to reconstruct the data in each video channel, and then converted back to analog format. For wide band system with frequency hopped schemes, the sequence of frequencies is predetermined. At the transmitter, the RF tone is sent to a Schmitt trigger to generate a one-bit clock stream. The low frequency data is digitized, and this is multiplied with the RF tone clock stream, and sent to the wide band modulator. At the receiver, this is detected, amplified and sent to the appropriate clock recovery circuit at the pre-determined frequency. The recovery of the RF tone and data follow as discussed above. In the case of the random RF frequency tone, then the tone has to be identified at the receiver, using a frequency detector. In this case the VCO is now in the form of a frequency synthesizer covering the bandwidth of the system. The frequency detector determines the frequency of the incoming pulse stream, and then sets the synthesizer VCO at the correct frequency for the phase lock loop. The frequency detector also sets the tunable RF filter so that the output of the clock recovery circuit through this filter is now the required RF tone. If base-band data is to be sent with this RF tone, then it is digitized, multiplied with the one-bit clock stream, sent to the modulator. At the receiver, the clock recovery circuit with the corresponding decision circuit and mixer regenerates the digitized data, which then passes through a DAC to recover the analog base-band data. Multiple RF tones use wavelength division multiplexing similar to the discussion above, with and without data.

When the analog information to be transported is a single high frequency RF tone for which 4-12 bit Analog to Digital Converters are not available, then that tone is sent to a Schmitt trigger or other circuit to create in a one-bit return-zero clock at the RF tone frequency. The one-bit clock at the RF tone frequency is sent to a modulator which modulates the light from a laser, usually a distributed-feedback (DFB) laser, to create light pulses at the RF tone frequency, and this light pulse stream is sent down the optical fiber to its destination. There is now no requirement for linearity of the modulator. The one-bit RF clock stream may also be generated by sending the RF tone to a high bandwidth modulator, biased to be off, so that a one-bit stream of optical pulses is produced, and this light pulse stream is sent down the optical fiber to its destination. Modulator linearity is no longer a necessary attribute required for the modulator. To create the pulse stream, the modulator may be biased to be off, and then the drive produces the pulses. It is not necessary for the drive to turn the modulator on completely, as even with reduced size pulses, the transmission link budget may be adjusted to obtain good signal to noise ratio at the output.

At the receiver, the optical signal is detected, amplified, and sent to a clock recovery circuit, which consists of a phase lock loop, which has a phase detector, a low pass filter, and a voltage-controlled oscillator, and possibly a frequency detector within the feedback loop, and here the one-bit clock is regenerated. Passing this recovered clock through a narrow band filter obtains the RF tone with no distortions. The alternative clock recovery circuit consists of a narrow band RF filter, a limiter, and a static phase sifter, and here again the RF tone is recovered as above. The signal to noise ratio is determined by the regeneration process of the clock recovery circuit, and the filtering process.

When a base-band signal in analog format is to be transported in addition to a corresponding RF tone, then this base-band signal is digitized, and electrically multiplied with the RF tone's one-bit clock, sent to the optical modulator to generate the optical pulses of the electrical multiplied signal. At the receiver, the clock recovery circuit regenerates the clock, and the decision circuit recovers and regenerates the base-band digitized signal. A narrow band filter recovers the RF tone, a decision circuit recovers the digitixed base-band signal, and a DAC recovers the base-band analog signal, and the base-band analog signal may modulate the RF tone through a RF modulator if this format is required. When the base-band data is to be transported in addition to the RF tone, digitizing both the tone and the base-band data, results in the one-bit clock and the digitized data which may be added instead of multiplied. At the receiver, low pass and high pass filters separate the signals which are then regenerated separately, and converted to analog signals as discussed above.

A base-band signal without a RF tone is digitized at a suitable clock rate, usually two or three times the maximum frequency of the signal, and sent to the optical modulator, to generate optical pulses. At the receiver, the detected and amplified pulses go to a clock recovery circuit, and decision circuit to regenerate the digitized signal, and this is sent to a DAC to recover the analog signal. Similarly, when several base-band signals are to be transported two alternatives arise: the first has the base-band signals frequency multiplexed, and then digitized. These are sent to the optical modulator, transported, and at the receiver, detected, recovered, converted to analog format, then demultiplexed to obtain the individual base-band signals. In the second scheme, they are individually digitized, and each sent to modulators to obtain optical pulses are different wavelengths. These are optically multiplexed and sent down the fiber, and at the receiver, these wavelengths are separated by an optical demultiplexer, before being detected, amplified and regenerated, and sent through appropriate DACs. The third scheme is to digitize the individual data (such as video) streams in the usual manner, and then use time division multiplexing to transport the individual streams. At the receiver, the usual recovery techniques are used to reconstruct the data in each video channel, and then converted back to analog format.

Multiple RF tones can be transported as one-bit streams each at a different wavelength, obtained by modulating light from lasers operating at different wavelengths. These different wavelength streams are combined through an optical multiplexer, and then sent down the fiber. At the receiver, the different wavelengths are separated using a demultiplexer, and the individual wavelengths, each pass through their clock recovery and filter, and decision circuit to recover both the RF tone and base band data. The transport is digital, and regenerated RF tones through the clock recovery loops, and then corresponding base band data through the decision circuits define the respective signal to noise ratios.

For wide band system with frequency hopped schemes, the sequence of frequencies is predetermined. At the transmitter, the RF tone is sent to a Schmitt trigger or other means to generate a one-bit clock stream. The low frequency data is digitized, and this is multiplied with the RF tone clock stream, and sent to the wide band modulator. At the receiver, this is detected, amplified and sent to the appropriate clock recovery circuit at the pre-determined frequency. The recovery of the RF tone and data follow as discussed above.

In the case of the random RF frequency tone, then the tone has to be identified at the receiver, using a frequency detector. In this case the VCO (voltage controlled oscillator) is now in the form of a frequency synthesizer covering the bandwidth of the system. The frequency detector determines the frequency of the incoming pulse stream, and then sets the synthesizer VCO at the correct frequency for the phase lock loop. The frequency detector also sets the tunable RF filter so that the output of the clock recovery circuit through this filter is now the required RF tone. If base-band data is to be sent with this RF tone, then it is digitized, multiplied with the one-bit clock stream, and sent to the modulator. At the receiver, the clock recovery circuit with the corresponding decision circuit and other circuits as necessary regenerates the digitized data, which then passes through a DAC to recover the analog base-band data.

Frequency hopped multiple RF tones use wavelength division multiplexing similar to the discussion above, with and without data. Here again, the predetermined frequency hopped system are treated as above, except that optical multiplexers and demultiplexers are required. For random hopped systems with multiple tones, again the tones need to be identified after demultiplexing at the receiver. Then the tone and data recovery is as discussed above.

Since modulator linearity is no longer an issue, direct modulation of the laser is also a possibility in each of the above cases, provided the laser responds to the appropriate RF tone, and the corresponding chirp introduced is not a problem.

Although the present invention has been described with reference to preferred embodiments, workers skilled in the art will recognize that changes may be made in form and detail without departing from the spirit and scope of the invention.

What is claimed is:

1. A communication system, comprising:
an analog input configured to receive an analog signal;
an analog to digital converter configured to provide a digital bit stream output based upon the analog input;
an RF tone source configured to provide an RF tone;
a multiplier configured to multiply the RF tone with the digital output bit stream and provide a multiplier output;

a laser;

a modulator configured to modulate the laser based upon the multiplier output thereby generating a modulated optical signal;

an optical fiber arranged to carry the modulated optical signal;

an optical detector arranged to receive the modulated optical signal from the optical fiber and provide a received output;

a clock recovery circuitry configured to recover the RF tone;

a digital to analog converter configured to digitized the received output and provide an analog output based upon the analog signal provided to the analog input; and an RF modulator configured to modulate the recovered analog output with the recovered RF tone and provide an RF tone modulated analog data output.

2. The apparatus of claim 1 wherein the RF tone is converted into a one-bit data stream.

3. The apparatus of claim 2 wherein the one-bit data stream is a return-zero data stream.

4. The apparatus of claim 2 wherein the one-bit data stream and the digital output are multiplied together to modulate the laser.

5. The apparatus of claim 2 wherein the one-bit data stream is formed by applying the RF signal to a modulator that is biased to be off.

6. The apparatus of claim 2 wherein the one-bit data stream is provided to a Schmitt trigger.

7. The apparatus of claim 1 wherein the recovery circuitry comprises a phase lock loop.

8. The apparatus of claim 1 including a narrow band filter to filter the recovered signal.

9. The apparatus of claim 1 wherein the clock recovery circuitry comprises a limiter, or a static phase shifter.

10. The apparatus of claim 1 including decision circuitry coupled to the digital to analog converter.

11. The apparatus of claim 1 including a plurality of analog inputs, analog to digital converters and lasers operations at multiple lengths configured to form a plurality of transmitters and a plurality of optical detectors and digital to analog converters configured to form a plurality of receivers.

12. The apparatus of claim 11 including a multiplexer configured to multiplex signals from to multiplex optical signals from the plurality of transmitters onto a single optical fiber and a demultiplexer configured to demultiplex a signal from the optical fiber to the plurality of receivers.

13. A method of communicating data between two locations, comprising:

receiving an analog signal;

digitizing the analog signal and providing a digital output;

providing an RF tone;

multiplying the digital output with the RF tone and generating a multiplied output;

modulating a laser based upon the multiplied output and thereby generating a modulated optical signal;

directing the modulated optical signal through an optical fiber;

receiving the modulated optical signal from the optical fiber;

recovering a clock signal from the modulated optical signal related to the RF tone;

recovering the digitized analog data and converting the digitized data into analog data; and generating RF tone modulated analog data based with the recovered RF tone and the recovered analog data.

14. The method of claim 13 including converting the RF tone into a one-bit data stream prior to multiplying.

15. The method of claim 14 wherein the one-bit data stream is a return-zero data stream.

* * * * *